United States Patent [19]
Helmerson

[11] Patent Number: 6,053,305
[45] Date of Patent: Apr. 25, 2000

[54] LIFT CONVEYOR WITH SINGLE BELT HAVING CRISS-CROSS RETURN SEGMENTS

[76] Inventor: Lars Helmerson, 3190 W. Fox Run Way, San Diego, Calif. 92111

[21] Appl. No.: 09/059,870

[22] Filed: Apr. 14, 1998

[51] Int. Cl.$^7$ .................................................. B65G 15/10
[52] U.S. Cl. ........................ 198/817; 198/828; 198/698; 198/588
[58] Field of Search ..................... 198/817, 511, 198/586, 588, 812, 690.2, 698, 828, 821

[56] References Cited

U.S. PATENT DOCUMENTS

| | | | |
|---|---|---|---|
| 4,582,192 | 4/1986 | Rojlar | 198/175 |
| 4,738,353 | 4/1988 | Johansson | 198/817 |
| 4,854,447 | 8/1989 | Johansson | 198/817 |

*Primary Examiner*—Christopher P. Ellis
*Assistant Examiner*—Jeffrey A. Shapiro
*Attorney, Agent, or Firm*—Michael H. Jester

[57] ABSTRACT

A single endless belt lift conveyor has lower criss-cross return segments that are guided by vertically spaced guide rollers that rotate about vertical axes. The vertical guide rollers are mounted to adjacent towers spaced along a telescoping boom of the conveyor. This arrangement ensures that load carrying cleats on the belt clear each other and allows the boom to be leaned against a roof, gutter, or other supporting structure without the cleats striking the same.

20 Claims, 4 Drawing Sheets

1

LIFT CONVEYOR WITH SINGLE BELT HAVING CRISS-CROSS RETURN SEGMENTS

BACKGROUND OF THE INVENTION

The present invention relates to material handling apparatus and more particularly, to a lightweight portable conveyor having parallel endless belt segments with upstanding cleats for lifting loads of shingles, tiles tar paper and other building materials to rooftops.

Residential construction frequently requires the lifting of substantial amounts of building materials to rooftops under construction or repair. It is inefficient and dangerous to accomplish such lifting with manual labor. The high cost of operating forklifts, cranes and other heavy lifting equipment is prohibitive is such applications. Skilled labor is required to operate such machinery and the hourly rental cost of the heavy lifting equipment can be very substantial.

Conveyors have long been available for lifting materials from the ground to higher elevations. If one single wide belt is utilized, the conveyor must have a very substantial supporting framework due to the substantial weight of the belt. Such single wide belt conveyors are thus quite heavy and not adapted for portability between job sites. In order to lessen the weight of lift conveyors various models have been developed that employ a long extensible boom with a pair of pulleys mounted at the rearward or lower end of the boom and another pair of pulleys mounted at the forward or upper end of the boom. A pair of endless belts, each having upstanding longitudinally spaced load supporting metal cleats, are then entrained around each set of forward and rearward pulleys so that they can be driven around the pulleys in parallel. An electric motor drives the rear pulleys through a gear reduction mechanism. Each belt is made of a light weight but very strong woven fabric material. Individual loads of building materials can be stacked on top of the upper forward moving segments of the belts, one load in advance of each set of transversely aligned cleats. Due to tolerance variations, the pulleys do not have identical diameters and the belts do not have identical lengths. Therefore, even though the cleats are initially aligned in the transverse direction, over time the cleats on one belt gradually lag further and further behind the corresponding cleats on the opposing belt. When the misalignment of corresponding opposite cleats becomes too great loads cannot be properly retained by the cleats and they fall off of the conveyor.

It is not practical to use chains instead of belts to ensure that the opposing pairs of cleats stay aligned. This is because such conveyors typically extend over thirty feet in length and the weight of such long endless chains would be prohibitive, not to mention the problems with rust and breakage of the chains that would be expected in harsh construction site environments. One solution to the aforementioned problem is disclosed in U.S. Pat. No. 4,366,900 granted in 1983 to Johansson. It discloses a lightweight twin belt lift conveyor which includes a belt synchronizing mechanism to maintain the load supporting cleats in opposing transverse alignment. Magnetic position indicators on the belts are sensed by a control circuit which selectively actuates clutch mechanisms to briefly stop either rearward drive pulley so that the other belt can catch up. However, the clutch mechanisms are complex, expensive, and subject to failure from excessive loading and wear. Also, the momentary stoppage of the drive pulleys can be abrupt and dislodge the loads.

U.S. Pat. No. 4,582,192 granted in 1986 to Rojlar, assigned to the inventor of the subject application, discloses another lightweight lift conveyor with a less complex belt synchronizing mechanism. Reed switches sense magnetic position indicators on the belts A control circuit connected to the reed switches momentarily moves spacer arms into and out of engagement with the drive pulleys to vary their circumference and thereby momentarily vary the speed of advancement of the corresponding belt. Again this system, while serviceable, was too expensive, too complex and subject to failure in the harsh construction site environment. A variation on this conveyor was successfully commercialized for many years by the assignee of the present application in which the operator manually moved a spacer into engagement with one of the drive pulleys as needed. However the operators tended to forget to engage or disengage the spacer. In addition, some operators actually used the spacers as brake mechanisms, causing damage and/or interfering with the proper operation of the lift conveyor.

U.S. Pat. No. 4,854,447 granted in 1989 to Johansson discloses a light-weight lift conveyor system having a single endless belt that is entrained about a pair of rearward pulleys and a pair of forward pulleys to define a pair of parallel upper forward run segments and a pair of lower rearward running return segments that criss-cross. With this arrangement, the load-supporting cleats remain transversely synchronized, i.e., side-by-side. This eliminates the need to use side-by-side, separate parallel belts and complex speed controls, clutching arrangements and/or pulley enlargers in order to transversely synchronize the cleats. In the design of the aforementioned U.S. Pat. No. 4,854,447 of Johansson, the lower return run segments of the belt criss-cross underneath the longitudinal frame spar or boom. This results in several problems. First of all, the cleats can tangle with each other as they cross each other. This can bend or even tear off the cleats, sever the belt, or damage the belt drive mechanism. Secondly, the underside of the conveyor cannot be leaned against, and supported by, a structure such as a roof or a gutter. Some sort of support stand must be attached to the remote outer end of the boom that will extend below the boom and the return segments of the belt. This type of stand adds weight, and also results in the load carried by the forward upper segments of the belt being delivered to a greater height than is necessary or convenient. Thirdly, it has proven to be extremely difficult for a construction worker to properly mount the endless belt at the job site.

SUMMARY OF THE INVENTION

The present invention provides a single endless belt lift conveyor with parallel upper forward run segments and lower criss-cross rearward run segments. The lower rearward running return segments of the endless belt are guided by vertically spaced guide rollers that rotate about vertical axes. The vertical guide rollers are mounted to adjacent towers spaced longitudinally along a boom of the conveyor. This ensures that the load bearing cleats on the belt clear each other. In addition, the boom of the lift conveyor can be leaned against a roof, gutter, or other supporting structure without the cleats striking the same.

BRIEF DESCRIPTION OF THE DRAWINGS

Throughout the drawing figures, like reference numerals refer to like parts.

FIG. 4 further illustrates the relationship of the upper forward run segments and the lower rearward run segments of the belt where the rearward run segments criss-cross between two adjacent towers that carry the vertical belt guide rollers.

DESCRIPTION OF THE PREFERRED EMBODIMENT

Figure 1:
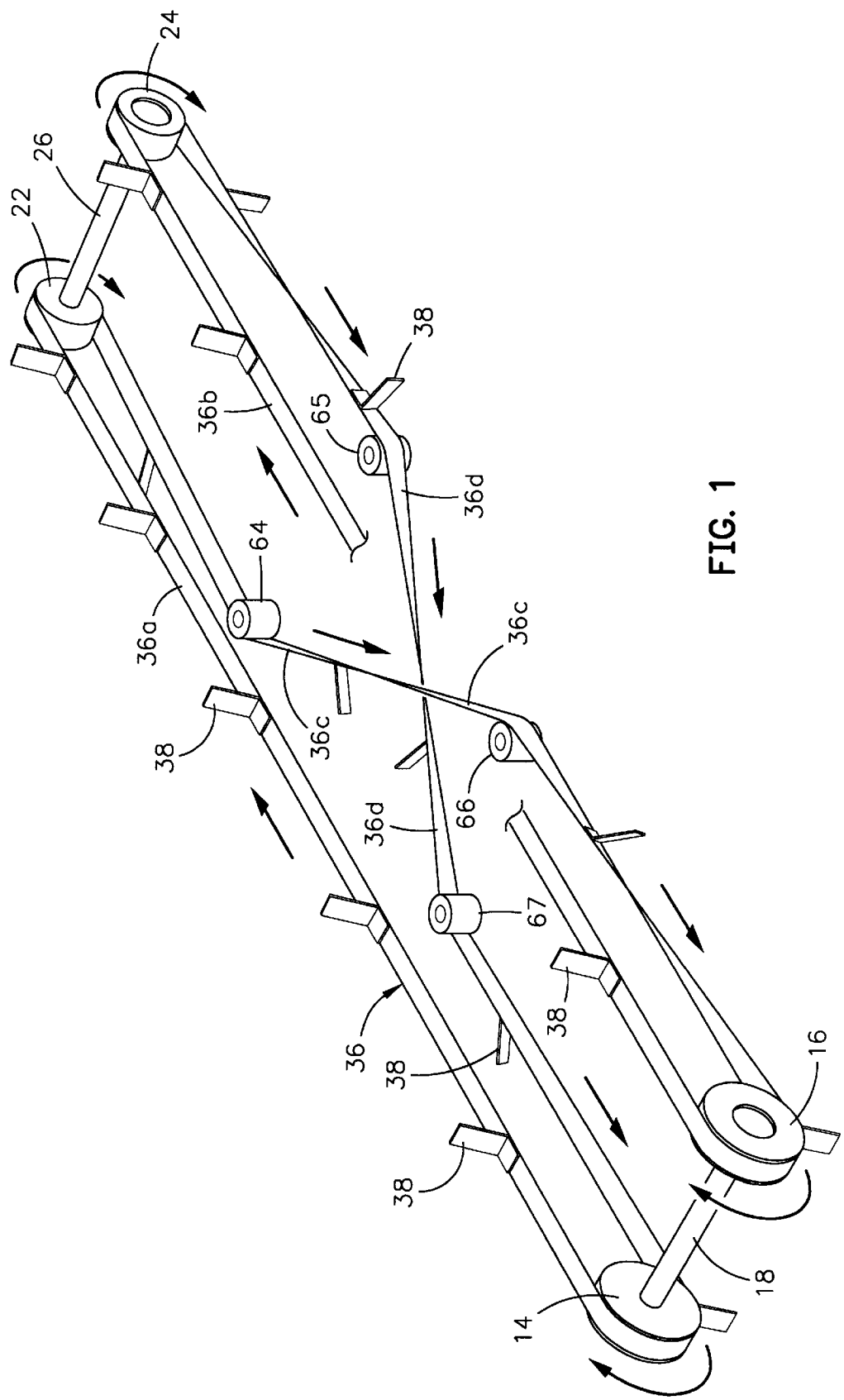
FIG. 1 is a diagrammatic isometric view of the endless belt of the preferred embodiment of my lift conveyor illustrating the manner in which the endless belt is entrained about a pair of drive pulleys and a pair of return pulleys, and how the lower rearward run segments of the belt engage vertically oriented guide rollers so that when they cross-over the load engaging cleats on the belt will clear each other.
Figure 2:
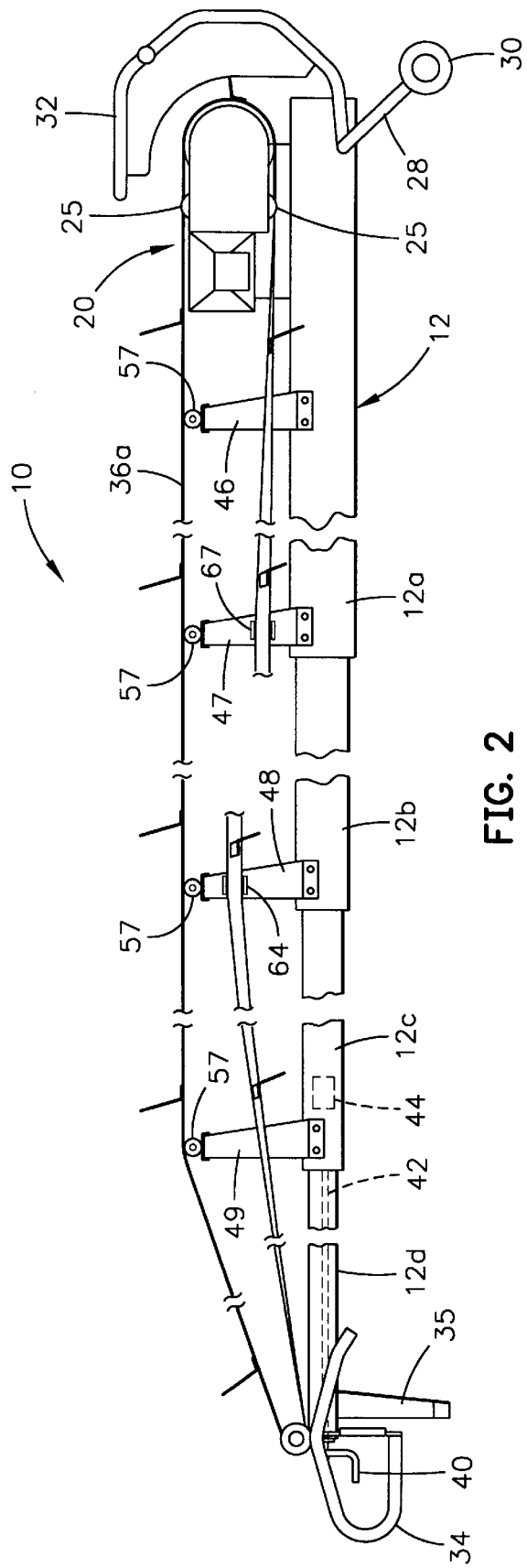
FIG. 2 is a fragmentary side elevational view of the preferred embodiment of my lift conveyor.

Referring to FIG. 2, a lightweight portable lift conveyor 10 includes a central boom 12 that extends in a longitudinal direction. A pair of transversely spaced drive pulleys 14 and 16 (FIG. 1) are rotatably mounted on opposite ends of a common drive axle 18 supported at a rearward end of the boom 12. A motor drive 20 (FIG. 2) is mounted to a rear end of the boom 12 and includes an electric motor, the drive pulleys 14 and 16, and a gear reduction for coupling the high speed motor shaft and the axle 18 to spin the axle at a relatively slow RPM. The drive axle 18 is journaled in bearings (not illustrated) forming a part of the motor drive 20. A pair of upper and lower horizontal guide rollers 25 (FIG. 2) are mounted adjacent each of the drive pulleys 14 and 16. A pair of transversely spaced return pulleys 22 and 24 (FIG. 1) are rotatably mounted on opposite ends of a return axle 26 journaled in bearings (not illustrated) mounted at the forward end of the boom 12.

The central boom 12 (FIG. 2) is comprised of a plurality of telescoping sections 12a. 12b. 12c and 12d preferably made of lightweight hollow Aluminum box beams of progressively smaller dimensions. In transit, the boom sections 12a–12d are collapsed into each other so that the lift conveyor 10 can be conveniently stowed in a pickup truck. Upon arrival at the construction site, the boom sections 12a–12d are extended or telescoped and locked into position relative to each other by locking means (not illustrated) such as aligned holes and pins brakes or other suitable mechanisms heretofore utilized in commercial lightweight telescoping lift conveyors of this general type.

The rear end of the boom 12 is provided with a pair of legs 28 (FIG. 2) each having a wheel 30 mounted at its lower end so that the lift conveyor 10 can easily be maneuvered by a single construction worker A handle bar assembly 32 is also mounted to the rear end of the boom 12 to allow the worker to grip the same to facilitate maneuvering of the rear end of the lift conveyor 10. Another handle bar assembly 34 is mounted to the forward end of the boom 12 to allow another worker to grip the same and easily maneuver the forward end of the lift conveyor 10. A vertical leg 35 extends downwardly from the forward end of the forwardmost boom section 12d. The leg 35 supports the forward end of the lift conveyor 10 after the boom sections have been fully extended and during the time that an endless belt 36 is installed.

The endless belt 36 (FIG. 1) is entrained around the pulleys 14, 16, 22 and 24 to define a pair of upper forward run segments 36a and 36b and a pair of lower rearward run segments 36c and 36d that cross-over each other. The upper forward run segments are generally parallel and substantially co-planar with each other. The endless belt 36 has a plurality of load engaging cleats 38 connected thereto at equal intervals, such as thirty-six inches apart for example. These cleats are typically L-shaped pieces of metal riveted to the belt 36.

The endless belt 36 (FIG. 1) is preferably made of a long length of strap with a full twist put into the same before its terminal ends are connected. The full twist is necessary for the belt to be able to navigate around the pulleys 14, 16, 22 and 24 in the geometry illustrated in FIG. 1 with the cleats 38 always on the outside of the pulleys. The strap material for the endless belt 36 is preferably lightweight fabric woven from a strong synthetic fiber such as that sold under the trademark NYLON. Of course the length of the strap needed depends upon the longitudinal dimension between the drive pulleys 14 and 16 and the return pulleys 22 and 24 and the transverse dimension between tile pulleys of each adjacent pair, By way of example, for a thirty-five foot long lift conveyor, the endless belt 36 may be made from a one-hundred and thirty-two foot long strap approximately three inches in width.

An adjustment mechanism is provided for moving the return pulleys 22 and 24 in and out to adjust tension of the endless belt 36. It is very important to have high tension on the endless belt 36 in order for the upper forward run segments 36a and 36b to carry substantial loads without undue sagging. A hand crank 40 (FIG. 2) at the forward end of the forwardmost boom section 12d turns a threaded shaft 42 inside the boom section 12d. The rearward end of the threaded shaft 42 screws into a threaded hole in a stationary collar 44 secured inside the boom section 12c. It will thus be understood that the crank 40 can be manually turned to extend or retract the boom section 12d relative to the boom section 12c. This varies the longitudinal distance between the rearward drive pulleys 14 and 16 and the forward return pulleys 22 and 24 thus applying or releasing tension on the endless belt 36. When the endless belt 36 is tensioned, the criss-cross segments 36c and 36d act like cross-braces adding to the sturdiness of the lift conveyor 10.

A plurality of vertically extending Aluminum towers 46, 47, 48 and 49 (FIG. 2) are mounted to the boom 12 at longitudinally spaced apart locations. The towers extend in an upward direction away from the boom 12. The towers 46 and 47 are bolted to the top portion of the boom section 12a, the tower 48 is bolted to the top portion of the boom section 12b and the tower 49 is bolted to the top portion of the boom section 12c. The construction of all the towers is identical so only one need be described in detail. Each tower such as 48 (FIG. 6) has a pair of substantially horizontally extending arms 50 and 52 that extend in the transverse direction from opposite sides of the upper end of the tower. In the preferred embodiment the arms 50 and 52 are formed from a single U-shaped piece of Aluminum screwed intermediate its length to the upper end of the tower 48.

Figure 6:
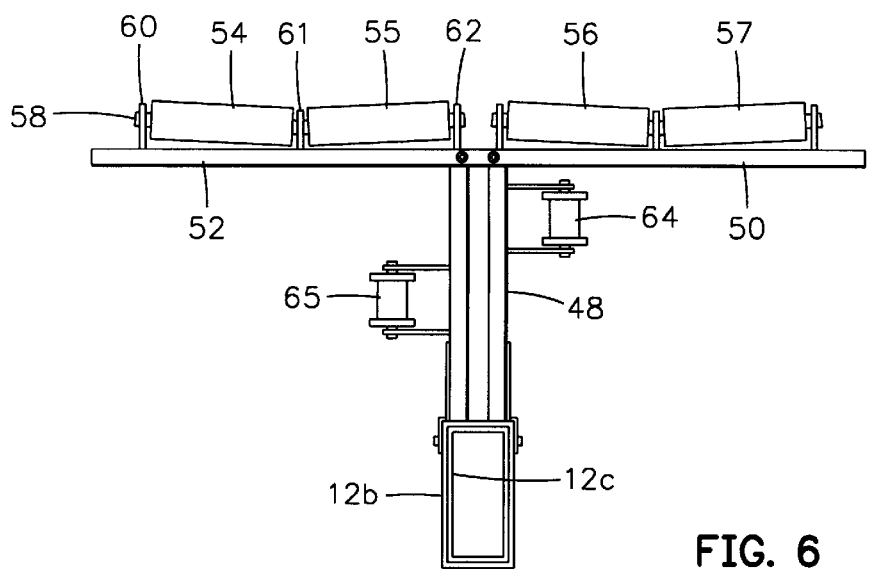
FIG. 6 is a front elevation view of one of the towers of the preferred embodiment of my lift conveyor illustrating the mounting of the horizontal and vertical guide rollers thereon.

Referring still to FIG. 6, a plurality of pairs of substantially horizontal guide rollers such as 54, 55, 56 and 57 are rotatably mounted on the arms 50 and 52 for carrying and guiding the parallel upper forward run segments 36a and 36b. Each of the horizontal guide rollers 54–57 rotates about an axis extending in a direction transverse to the longitudinal extension of the central boom 12. Each of the horizontal guide rollers 54–57 preferably comprises a long cylindrical body made of a highly wear resistant plastic such as that sold under the trademark DELRIN. These cylindrical rollers are formed with a central bore through which support rods such as 58 extend. The ends of the support rods are secured in holes in upstanding brackets such as 60, 61 and 62 secured to the arms such as 52 of each tower such as 48. The rods supporting adjacent horizontal guide rollers such as 54 and 55 extend at a slight angle relative to each other so that the upper forward run segments such as 36a of the endless belt 36 will stay centered in the slight valley created between the two adjacent substantially horizontal rollers 54 and 55.

Figure 3:
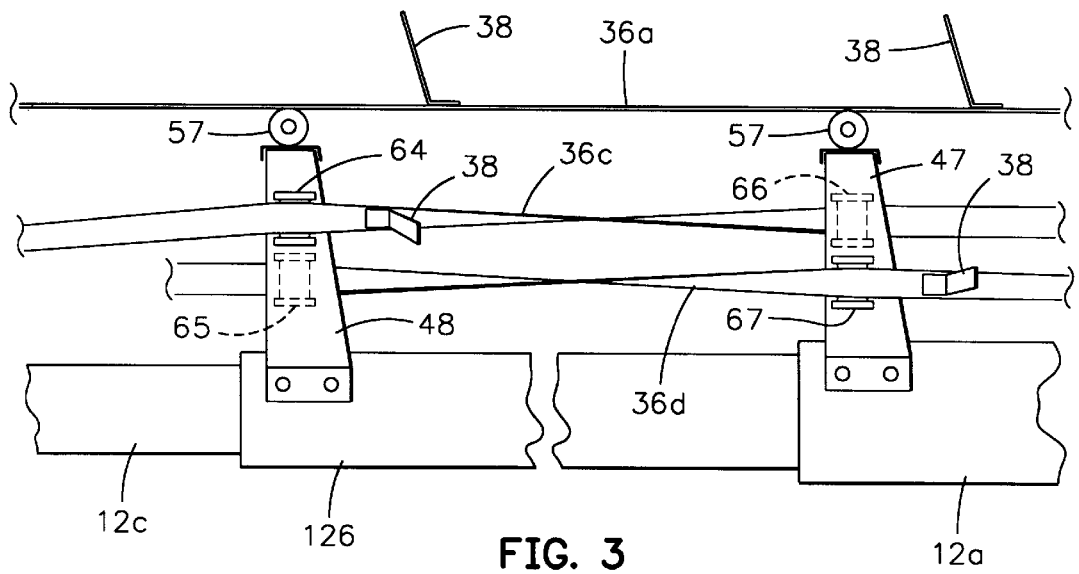
FIG. 3 is an enlarged, fragmentary side elevation view of an intermediate portion of the preferred embodiment of my lift conveyor illustrating the relationship of the upper forward run segments and the lower rearward run segments of the belt where the rearward run segments criss-cross between two adjacent towers that carry vertical belt guide rollers.
Figure 4:
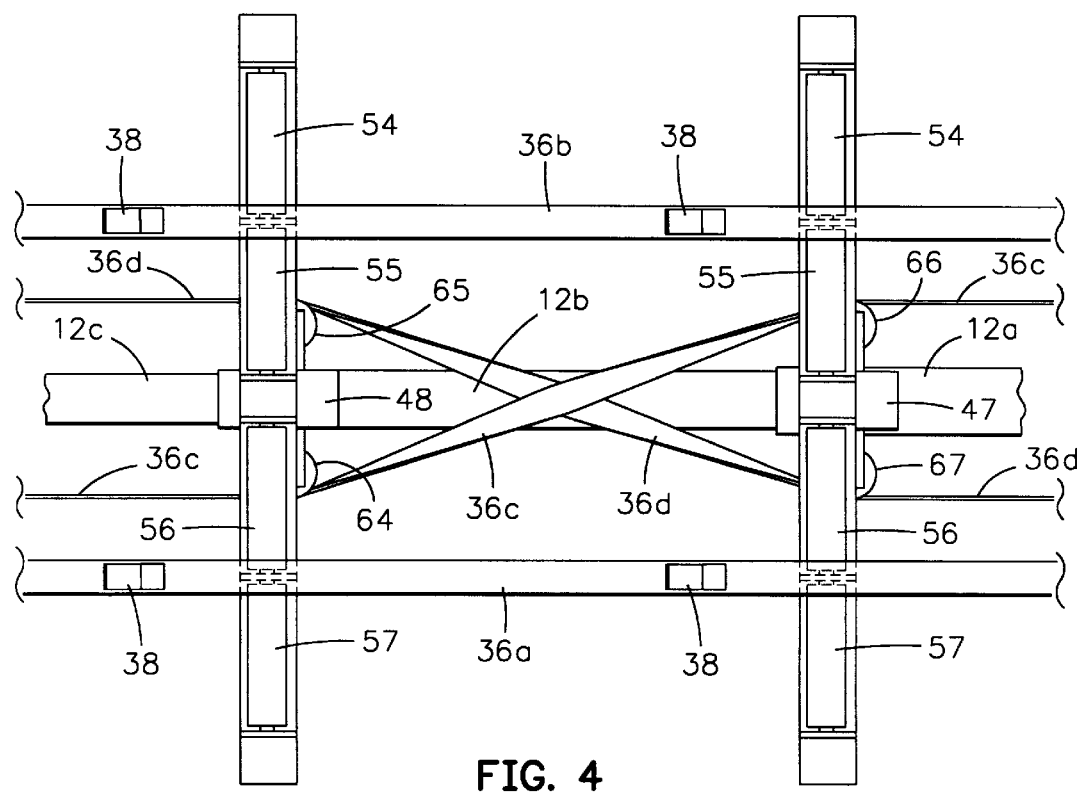
FIG. 4 is an enlarged, slightly exaggerated top plan view of the same intermediate portion of the preferred embodiment of my lift conveyor that is illustrated in FIG. 3.

Four vertical guide rollers 64, 65, 66 and 67 (FIG. 1) are provided for guiding the lower rearward run segments 36c and 36d of the endless belt 36 so that the cross-over each other. One pair 64 and 65 of the vertical guide rollers are mounted to opposite sides of the tower 48 as shown in FIGS. 3 and 6. Another pair 66 and 67 of the vertical guide rollers are mounted to opposite sides of the tower 47 as shown in FIG. 3. The vertical positioning of the guide rollers 64–67 is carefully selected to ensure that the lower rearward run segments 36c and 36d of the endless belt 36 criss-cross without their cleats 38 interfering with each other. The mounting of the vertical guide rollers 64–67 on the towers 47 and 48 at different vertical heights also ensures that the lower rearward run segments 36c and 36d of the endless belt 36 and the terminal outer ends of the cleats 38 carried thereby arc above the underside of the central boom 12. This permits the forward portion of the boom to be leaned against and supported on an edge of a roof during construction or repair thereof. This was not possible with the lift conveyor of U.S. Pat. No, 4,854,447 of Johansson in which the lower criss-cross rearward run segments of the single endless belt extended beneath the underside of the boom. A roof stand (not illustrated) may be attached to the forward end of the boom 12 to prevent damage to gutters. The endless belt segments 36a, 36b, 36c and 36d run synchronously around the pulleys and guide rollers with the cleats 38 on the upper run segments 36a and 36b in transverse alignment.

As best seen in FIG. 3, the vertical guide rollers 64 and 66 are mounted to the towers 48 and 47, respectively at a first height, and on opposite sides of the boom 12. The vertical guide rollers 65 and 67 are mounted to the towers 48 and 47, respectively at a second height below the first height, and on opposite sides of the boom 12. The vertical guide rollers for each tower are thus mounted at different heights on opposite sides of the same tower. The vertical guide rollers 64–67 are configured like spools in that they have retaining flanges on opposite ends thereof to ensure that the endless belt 36 stays entrained about them and does not slip off.

Figure 5:
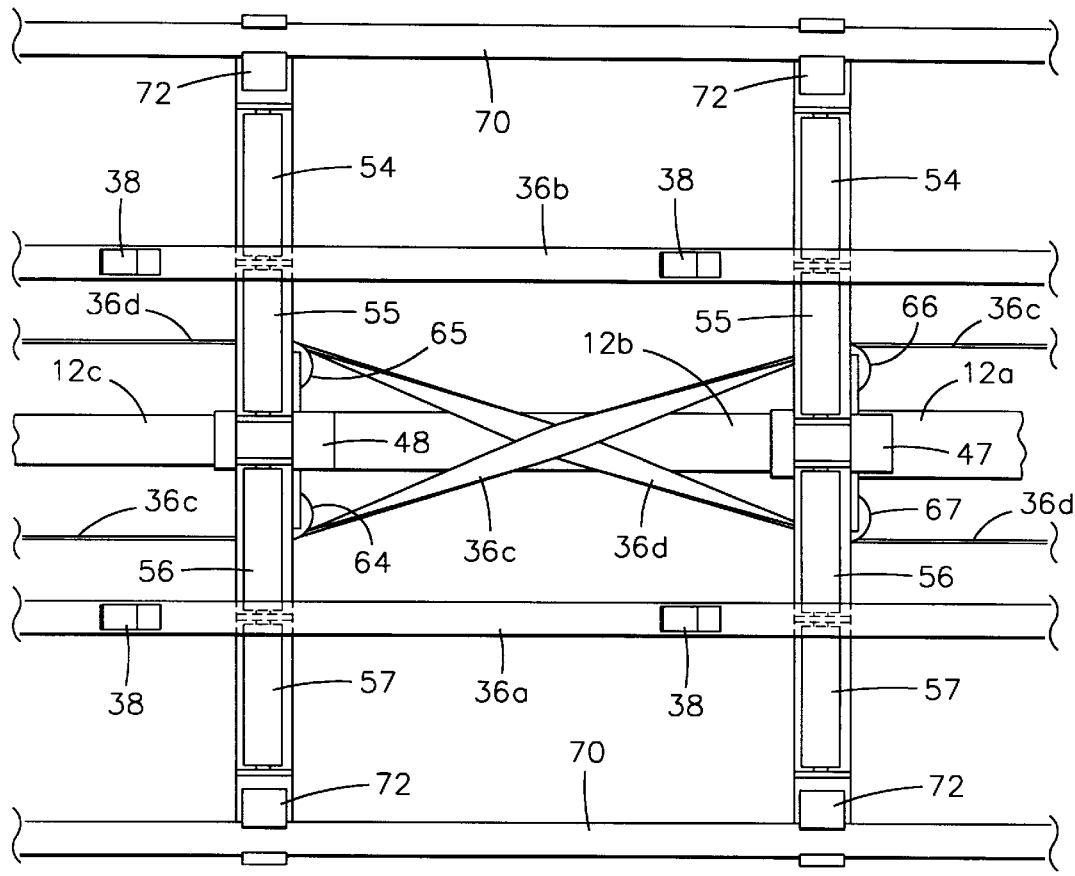
FIG. 5 is a view similar to FIG. 4 illustrating a modification of the preferred embodiment that includes stationary parallel auxiliary load supporting straps.

A pair of parallel auxiliary load supporting straps 70 (FIG. 5) may be threaded through brackets 72 connected to the outer ends of the arms such as 50 and 52. Where wide loads of building materials are to be carried by the lift conveyor 10 that extend transversely well beyond the upper belt segments 36a and 36b, the auxiliary straps 70 may be installed to stabilize the loads.

It will also be understood that my invention provides a useful and novel method of lifting loads of building materials from ground level to roof level. The first step of my method is to provide a longitudinally extending boom having sufficient length to extend between a ground location and an edge of a roof of a building under construction or repair. Next, an endless belt with equally spaced load engaging cleats is entrained around transversely spaced pairs of drive and return pulleys rotatably mounted to the rearward and forward ends of the boom and around a plurality of guide rollers mounted along the length of the boom. The guide rollers are positioned: 1) to define parallel upper forward run segments and lower rearward run segments that criss-cross over each other; 2) the cleats do not interfere with each other; and 3) the cleats and belt do not extend below an underside of the boom. The next step of my method is to erect the boom so that its rearward end rests on the ground location and a forward portion of the boom rests on the edge of the roof. The drive pulleys are then propelled to cause the endless belt to continuously wind around the pulleys and guide rollers with the upper segments moving forwardly and the lower segments moving rearwardly. In accordance with the final steps of my method, individual loads of building material are manually stacked on top of the upper forward run segments of the endless belt in advance of pairs of transversely aligned cleats so that the loads are carried up to the roof. These loads of building material are manually removed from the upper segments of the belt when they reach the edge of the roof. The use of a tensioned single endless belt to form all of the forward and rearward load supporting segments ensures against any slippage.

The endless belt 36 is best installed by first installing it over the right front return pulley 24, laying it over the horizontal guide rollers 54 and 55, and wrapping it around the right rear drive pulley 16. The belt 36 is then threaded around the vertical guide rollers 66 and 64 and around the left front return pulley 22. From there, the belt 36 is threaded over the horizontal guide rollers 56 and 57 on the left side of the lift conveyor, and around the left drive pulley 14. The remainder of the belt 36 is then threaded around the vertical guide rollers 67 and 65. The foregoing installation procedure is simple enough for the average construction worker to accomplish at the job site.

The lift conveyor 10 is often collapsed and extended several times per day. It is not necessary to remove the endless belt 36 each time this is done. Instead, when the boom 12 is collapsed, the endless belt 36 is wrapped around the towers 46, 47, 48 and 49 in a figure eight fashion. When it is time to extend the lift conveyor 10, the belt 36 is unwrapped, the boom 12 is extended, and the two lower belt segments 36c and 36b are moved to the cross-over point. The upper segments 36a and 36b are threaded over the horizontal guide rollers 54 and 55 from the front return pulleys 22 and 24 back to the drive pulleys 14 and 16. The cross-over point on the boom 12 is preferably marked such as by an adhesive label. The tension on the belt 36 is then increased to a suitable point via hand crank 40. The belt segments 36c and 36d then wrap around the vertical guide rollers 64, 65, 66 and 67. The foregoing procedure can be accomplished by the average construction worker in about two minutes.

Having described a preferred embodiment of my single belt lift conveyor having criss-cross return segments, modifications and adaptations thereof will occur to those skilled in the art. Therefore, the protection afforded my invention should only be limited in accordance with the following claims.

I claim:

1. A lift conveyor, comprising:

a boom extending in a longitudinal direction;

first and second drive pulleys;

means for rotatably mounting the first and second drive pulleys at a rearward end of the boom;

first and second return pulleys;

means for rotatably mounting the first and second return pulleys at a forward end of the boom;

a plurality of vertically extending towers mounted to the boom at longitudinally spaced apart locations along the boom and extending in an upward direction away from the boom;

a plurality of pairs of first guide rollers, one pair corresponding to each tower;

first means for rotatably mounting each pair of first guide rollers adjacent the upper end of a corresponding tower for rotation about an axis extending generally horizontally and in a direction transverse to the longitudinal extension of the central boom;

two pairs of second guide rollers, one pair corresponding to each of two predetermined towers;

second means for rotatably mounting each pair of second guide rollers at vertically spaced locations along the length of a corresponding tower and beneath the upper end of the corresponding tower for rotation about generally vertical axes;

an endless belt having a plurality of load engaging cleats connected thereto at equal intervals, the belt being entrained around the drive and return pulleys to define a pair of upper forward run segments that ride on top of the first guide rollers, the upper forward run segments being generally parallel and substantially co-planar with each other, and a pair of lower rearward run segments that ride around the second guide rollers and cross-over each other; and motor means for rotating the drive pulleys to cause the endless belt to run in a continuous fashion about the drive pulleys, return pulleys and guide rollers;

whereby adjacent cleats on the upper forward run segments of the belt will maintain their transverse alignment and the cleats on the lower rearward run segments will clear each other where they cross-over.

2. The lift conveyor of claim 1 wherein the boom is comprised of a plurality of telescoping sections.

3. The lift conveyor of claim 2 and further comprising means for adjusting a longitudinal position of the return pulleys for tensioning the belt.

4. The lift conveyor of claim 1 wherein the motor means comprises an electric motor and a gear reduction drive for coupling a shaft of the motor with an axle carrying at least one of the drive pulleys.

5. The lift conveyor of claim 1 wherein the endless belt is made of a long length of strap with a full twist put into the same before its terminal ends are connected.

6. The lift conveyor of claim 1 wherein the means for rotatably mounting each pair of the second guide rollers are mounted on transversely opposite sides of the corresponding tower.

7. The lift conveyor of claim 1 wherein each tower has a pair of substantially horizontally extending arms that extend in the transverse direction from opposite sides of the upper end of the tower and the means for rotatably mounting the first guide rollers are located on corresponding ones of the arms.

8. The lift conveyor of claim 7 and further comprising stationary parallel auxiliary load supporting straps connected to the outer ends of corresponding ones of the arms.

9. The lift conveyor of claim 7 wherein the means for rotatably mounting the first guide rollers are configured so that each pair of first guide rollers on each side of each tower rotate around transversely extending axes that are slightly angled relative to each other so that a corresponding upper forward run segment carried thereby will tend to be centered between each pair of first guide rollers that are on the same side of a corresponding tower.

10. A lift conveyor comprising:

a longitudinally extending boom;

a motor drive mounted to a rear end of the boom including a pair of transversely spaced drive pulleys;

a pair of return pulleys;

means for rotatably mounting the return pulleys in transversely spaced arrangement on a forward end of the boom;

an endless belt having a plurality of load engaging cleats connected thereto at equally spaced intervals;

a plurality of belt engaging guide rollers; and means for mounting the belt engaging guide rollers to the boom at predetermined orientations and longitudinally spaced locations so that the endless belt can be entrained and continuously driven around the pulleys and the belt engaging guide rollers to define a pair of upper forward run segments that ride on top of a first set of the belt engaging guide rollers, the upper forward run segments being generally parallel and substantially co-planar with each other, and a pair of lower rearward run segments that ride around a second set of the belt engaging guide rollers and cross-over each other so that adjacent cleats on the upper forward run segments of the belt will maintain their transverse alignment, the cleats on the lower rearward run segments will clear each other where they cross-over, and a lower side of the boom can be rested on a building structure without interfering with the motion of the cleats.

11. The lift conveyor of claim 10 and further comprising means for adjusting the longitudinal position of the return pulleys for tensioning the belt.

12. The lift conveyor of claim 10 wherein the endless belt is made of a long length of strap with a full twist put into the same before its terminal ends are connected.

13. The lift conveyor of claim 10 wherein the means for mounting the belt engaging guide rollers includes a plurality of towers mounted to the central boom at spaced apart locations along the boom and extending in an upward direction away from the boom.

14. The lift conveyor of claim 13 wherein the means for rotatably mounting each pair of the second set of belt engaging guide rollers are mounted on transversely opposite sides of a corresponding tower at different vertical heights.

15. The lift conveyor of claim 13 wherein each tower has a pair of substantially horizontally extending arms that extend in the transverse direction from opposite sides of the upper end of the tower and the means for rotatably mounting the first set of belt engaging guide rollers are located on corresponding ones of the arms.

16. The lift conveyor of claim 15 and further comprising stationary parallel auxiliary load supporting straps connected to the outer ends of the arms.

17. The lift conveyor of claim 13 wherein the means for mounting the second set of belt engaging guide rollers are mounted on an adjacent pair of towers, each adjacent tower having a pair of the second set of belt engaging guide rollers mounted at vertically spaced locations on opposite transverse sides of the tower, the belt engaging guide rollers on the same side of the towers being mounted at different vertical heights.

18. The lift conveyor of claim 10 wherein the belt engaging guide rollers of the second set have retaining flanges on opposite ends thereof.

19. A lift conveyor with dual upper run segments for carrying building materials and dual lower run segments, said lift conveyor comprising an elongate boom, an endless belt, a pair of belt drive pulleys mounted on said boom and a pair of return pulleys mounted on said boom remote from said drive pulleys, said drive pulleys and said return pulleys defining opposing ends of the lift conveyor, said endless belt being a single continuous belt defining dual upper run segments and dual lower run segments, each of said segments extending along a substantial portion of a length of the lift conveyor between a corresponding drive pulley and a corresponding return pulleys, and guide means for the lower run segments positioned to control the crossing of said lower run segments to maintain said lower run segments in vertical spaced relation to each other whereby contact therebetween is avoided for movement of each of the lower run segments unencumbered by the other crossing lower run segment, the upper run segments extending parallel and generally coplanar to each other, one upper run segment extending on each side of the boom, the lower run segments crossing over a top side of the boom, and said upper and lower run segments moving synchronously during operation of the lift conveyor.

20. A method of lifting loads of building materials from ground level to a roof level, comprising the steps of:

providing a longitudinally extending boom having sufficient length to extend between a ground location and an edge of a roof of a building under construction or repair;

entraining an endless belt with equally spaced load engaging cleats around transversely spaced pairs of rearward drive and forward return pulleys rotatably mounted to the rearward and forward ends of the boom, respectively, and around a plurality of guide rollers mounted along the length of the boom to define parallel upper forward run segments and to define lower rearward run segments that criss-cross over each other so that the cleats do not interfere with each other and so that the cleats and belt do not extend below an underside of the boom;

erecting the boom so that its rearward end rests on the ground location and a forward portion of the boom rests on the edge of the roof.

propelling the drive pulleys to cause the endless belt to continuously wind around the pulleys and guide rollers with the upper segments moving forwardly and the lower segments moving rearwardly;

stacking individual loads of building material on top of the upper forward run segments in advance of pairs of transversely aligned cleats so that the loads are carried up to the roof; and removing the loads of building material from the upper segments of the belt when they reach the edge of the roof.

* * * * *